United States Patent
Kang et al.

(10) Patent No.: US 11,242,487 B2
(45) Date of Patent: *Feb. 8, 2022

(54) LIQUID CRYSTAL COMPOSITION, LIQUID CRYSTAL DISPLAY ELEMENT AND LIQUID CRYSTAL DISPLAY

(71) Applicant: Shijiazhuang Chengzhi Yonghua Display Material Co., ltd., Hebei (CN)

(72) Inventors: Sumin Kang, Hebei (CN); Zhian Liang, Hebei (CN); Guoliang Yun, Hebei (CN); Xuan Zhang, Hebei (CN); Jiaming Li, Hebei (CN); Ruixiang Liang, Hebei (CN)

(73) Assignee: SHIJIAZHUANG CHENGZHI YONGHUA DISPLAY MATERIAL CO., LTD., Hebei (CN)

( * ) Notice: Subject to any disclaimer, the term of this patent is extended or adjusted under 35 U.S.C. 154(b) by 173 days.

This patent is subject to a terminal disclaimer.

(21) Appl. No.: 16/381,430

(22) Filed: Apr. 11, 2019

(65) Prior Publication Data

US 2020/0239779 A1 Jul. 30, 2020

(30) Foreign Application Priority Data

Jan. 29, 2019 (CN) .......................... 201910087674.2

(51) Int. Cl.
*C09K 19/30* (2006.01)
*C09K 19/44* (2006.01)
*C09K 19/12* (2006.01)
*C09K 19/04* (2006.01)

(52) U.S. Cl.
CPC .............. *C09K 19/44* (2013.01); *C09K 19/12* (2013.01); *C09K 19/3003* (2013.01); *C09K 19/3028* (2013.01); *C09K 19/3066* (2013.01); *C09K 19/3098* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3016* (2013.01); *C09K 2019/3036* (2013.01)

(58) Field of Classification Search
CPC ..................................................... C09K 19/30
See application file for complete search history.

(56) References Cited

U.S. PATENT DOCUMENTS

| 9,745,513 B2* | 8/2017 | Kuriyama | ............ C09K 19/542 |
|---|---|---|---|
| 2015/0152330 A1* | 6/2015 | Yun | ........ C09K 19/30 252/299.63 |
| 2015/0299161 A1* | 10/2015 | Reiffenrath | .......... C07D 409/04 252/299.61 |
| 2016/0208170 A1* | 7/2016 | Hirschmann | ........ C09K 19/322 |
| 2017/0362506 A1* | 12/2017 | Hirschmann | .......... C09K 19/12 |

* cited by examiner

*Primary Examiner* — Chanceity N Robinson
(74) *Attorney, Agent, or Firm* — Muncy, Geissler, Olds & Lowe, P.C.

(57) ABSTRACT

A liquid crystal composition, and a liquid crystal display element or liquid crystal display comprising the liquid crystal composition, and belongs to the field of liquid crystal display, the liquid crystal composition of the present disclosure comprising a compound represented by formula I, one or more compounds represented by formula II, one or more compounds represented by formula III, and at least one polymerizable compound. The liquid crystal composition simultaneously has a low rotary viscosity ($\gamma$1), a larger dielectric anisotropy ($\Delta\varepsilon$), and a fast response speed.

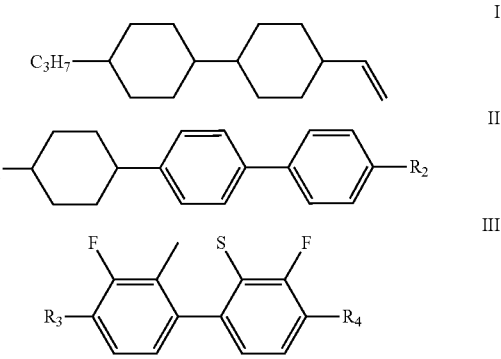

5 Claims, No Drawings

LIQUID CRYSTAL COMPOSITION, LIQUID CRYSTAL DISPLAY ELEMENT AND LIQUID CRYSTAL DISPLAY

TECHNICAL FIELD

The present disclosure belongs to the field of liquid crystal display, and more particularly relates to a liquid crystal composition and a liquid crystal display element or liquid crystal display comprising the liquid crystal composition.

BACKGROUND ART

Early commercial TFT-LCD products basically relate to using a TN display mode, and the largest problem thereof is a narrow viewing angle. With the increase in product size, especially in applications in the TV field, an IPS display mode and a VA display mode, which feature a wide view angle, have been sequentially developed and applied; in particular, on the basis of the improvement of the VA display mode, many big companies have successively made a breakthrough in the development thereof, which mainly depends on the advantages of a wide view angle, a high contrast, no need for rubbing alignment, etc., of the VA mode itself; furthermore, the contrast of the VA mode display is less dependent on the optical anisotropy ($\Delta n$) of a liquid crystal, the thickness of a liquid crystal cell (d) and the wavelength ($\lambda$) of an incident light, which will inevitably make the VA mode become a very promising display technique.

However, liquid crystal media used for display elements of the VA mode, etc. themselves are not perfect, and compared with positive dielectric anisotropic display elements, they have the disadvantages of a smaller dielectricity, a relatively slow response time, a relatively high drive voltage, etc., and are more prone to the problems of defective displaying, afterimage etc.

At present, liquid crystal compositions which are applicable to display devices and excellent in response speed and in which various display defects are improved are still desired.

SUMMARY OF THE INVENTION

In order to solve the problems in the prior art, the present inventors have conducted intensive studies and surprisingly found that a liquid crystal composition containing a combination of a compound represented by formula I, a compound represented by formula II, and a compound represented by formula III as mentioned hereinafter exhibits a fast response speed when applied to a liquid crystal display element; furthermore, when the liquid crystal composition is used in the manufacture procedure for an ODF liquid crystal device, the liquid crystal display has no defective displaying, thereby completing the present disclosure.

A first object of the present disclosure is to provide a liquid crystal composition having a low rotary viscosity ($\gamma 1$), a larger dielectric anisotropy ($\Delta \varepsilon$), and a fast response speed.

A second object of the present disclosure is to provide a liquid crystal display element comprising the liquid crystal composition of the present disclosure. The liquid crystal display element has a fast response speed.

A third object of the present disclosure is to further provide a liquid crystal display comprising the liquid crystal composition of the present disclosure. The liquid crystal display has a fast response speed.

In order to achieve the above-mentioned objects, the following technical solution is used in the present disclosure:

The liquid crystal composition of the present disclosure comprising a compound represented by formula I, one or more compounds represented by formula II, one or more compounds represented by formula III, and at least one polymerizable compound:

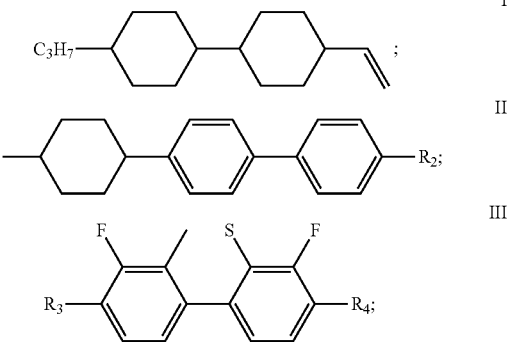

wherein:

in formula II, $R_1$ and $R_2$ each independently represent an alkyl group having a carbon atom number of 1-10; and in formula III, $R_3$ and $R_4$ each independently represent an alkyl group having an atom number of 1-10, a fluorine-substituted alkyl group having a carbon atom number of 1-10, an alkoxy group having a carbon atom number of 1-10 or a fluorine-substituted alkoxy group having a carbon atom number of 1-10.

In the liquid crystal composition of the present disclosure, there is no limitation on the above-mentioned polymerizable compound, and a person skilled in the art would be able to select a suitable polymerizable compound according to common knowledge in the art.

The present disclosure further provides a liquid crystal display element comprising the liquid crystal composition of the present disclosure, which liquid crystal display element is an active matrix addressing display element or a passive matrix addressing display element.

The present disclosure further provides a liquid crystal display comprising the liquid crystal composition of the present disclosure, which liquid crystal display is an active matrix addressing display or a passive matrix addressing display.

DETAILED DESCRIPTION OF EMBODIMENTS

[Liquid Crystal Composition]

The liquid crystal composition of the present disclosure comprising a compound represented by formula I, one or more compounds represented by formula II, one or more compounds represented by formula III, and at least one polymerizable compound.

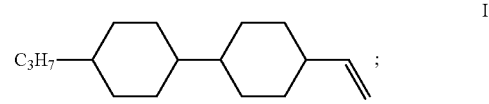

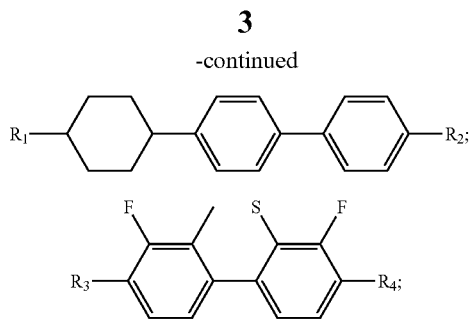

wherein:

in formula II, $R_1$ and $R_2$ each independently represent an alkyl group having a carbon atom number of 1-10; and in formula III, $R_3$ and $R_4$ each independently represent an alkyl group having an atom number of 1-10, a fluorine-substituted alkyl group having a carbon atom number of 1-10, an alkoxy group having a carbon atom number of 1-10 or a fluorine-substituted alkoxy group having a carbon atom number of 1-10.

In formula II, as the alkyl groups having a carbon atom number of 1-10 as represented by $R_1$ and $R_2$ mentioned above, examples include methyl, ethyl, n-propyl, isopropyl, n-butyl, isobutyl, tert-butyl, n-pentyl, isopentyl, hexyl, heptyl, octyl, nonyl, decyl, etc.

In formula III, as the alkyl groups having a carbon atom number of 1-10 as represented by $R_3$ and $R_4$ mentioned above, examples include methyl, ethyl, n-propyl, isopropyl, n-butyl, isobutyl, tert-butyl, n-pentyl, isopentyl, hexyl, heptyl, octyl, nonyl, decyl, etc.

As the alkoxy group having a carbon atom number of 1-10, examples include methoxy, ethoxy, n-propoxy, isopropoxy, n-butoxy, isobutoxy, pentyloxy, hexyloxy, heptyloxy, octyloxy, nonyloxy, decyloxy etc.

The fluorine substitution as mentioned above may be a monofluoro substitution, a difluoro substitution, a trifluoro substitution, etc., and the fluorine substitution may be a fluorine substitution on a single carbon atom or may also be a fluorine substitution on a plurality of carbon atoms.

As the alkoxy group having a carbon atom number of 1-10, examples include groups obtained by further fluoro-substituting, e.g., monofluoro-substituting, difluoro-substituting or trifluoro-substituting, the alkoxy groups having a carbon atom number of 1-10 as mentioned above, such as methoxy, ethoxy, n-propoxy, isopropoxy, n-butoxy, isobutoxy, pentyloxy, hexyloxy, heptyloxy, octyloxy, nonyloxy and decyloxy.

In the liquid crystal composition of the present disclosure, the above-mentioned polymerizable compound is preferably selected from formulas

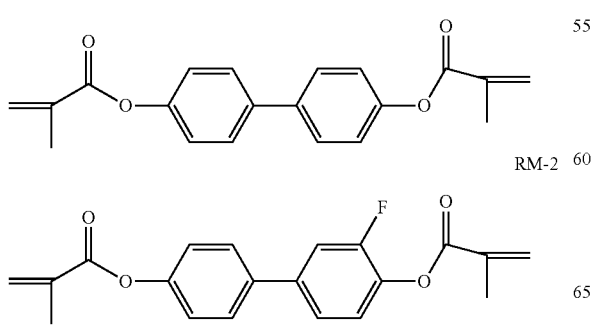

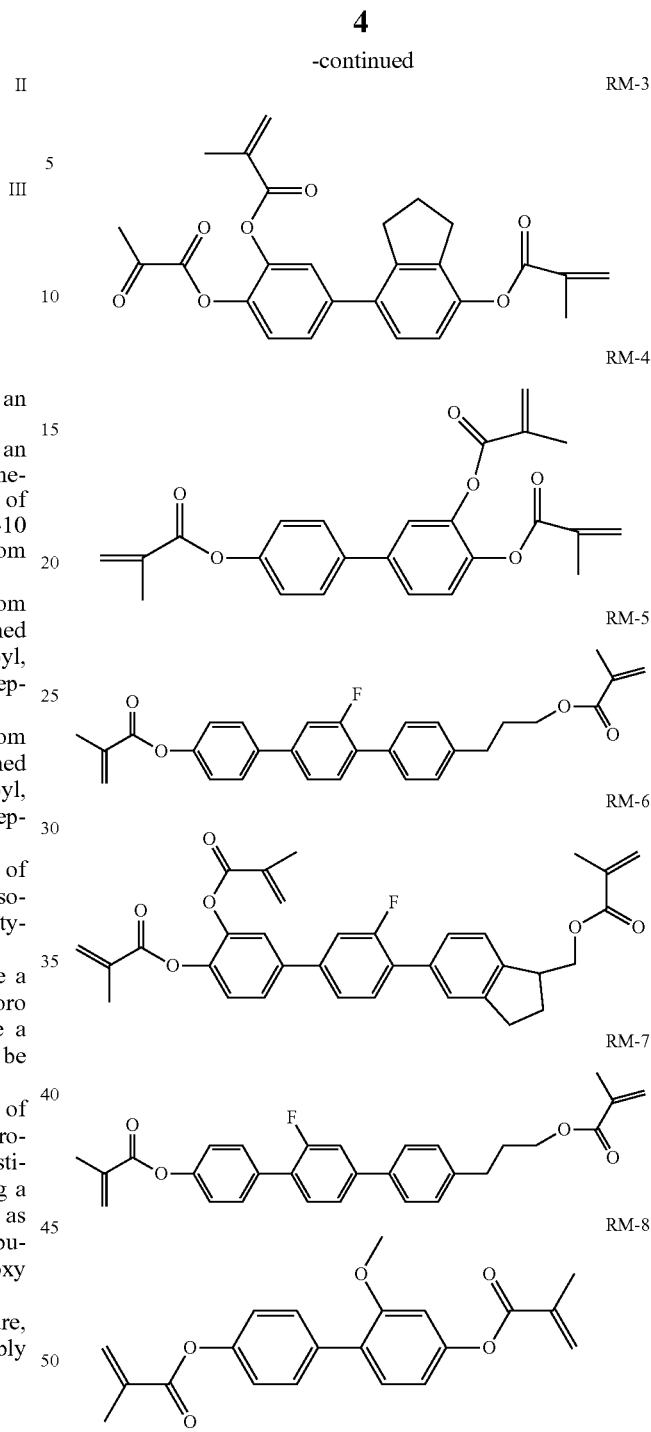

The liquid crystal composition of the present disclosure preferably further comprises one or more compounds represented by formula IV:

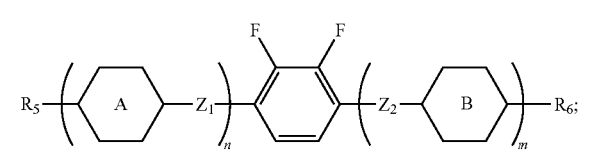

wherein $R_5$ and $R_6$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, and any one or more unconnected $CH_2$ in the groups represented by $R_5$ and $R_6$ are optionally substituted with cyclopentyl, cyclobutyl or cyclopropyl;

$Z_1$ and $Z_2$ each independently represent a single bond, $-CH_2CH_2-$ or $-CH_2O-$;

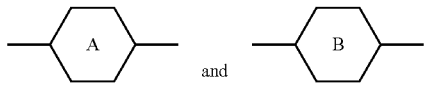

represent 1,4-cyclohexylene, 1,4-cyclohexenylene, 1,4-phenylene or a fluorinated 1,4-phenylene; and m and n each independently represent 0, 1 or 2, with m+n<2.

In the liquid crystal composition of the present disclosure, preferably, the compound represented by formula IV mentioned above is selected from the group consisting of compounds represented by formula IV-1 to IV-13 below:

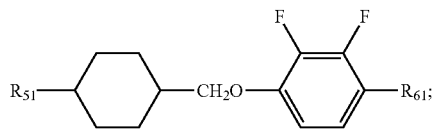
IV-1

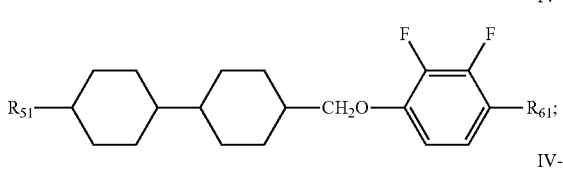
IV-2

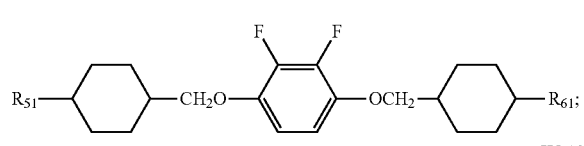
IV-3

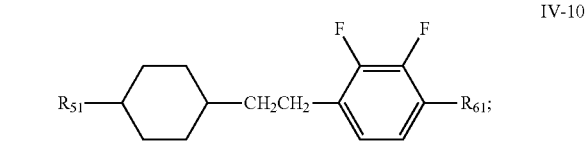
IV-4

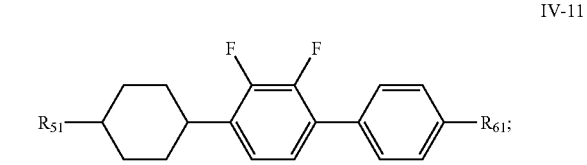
IV-5

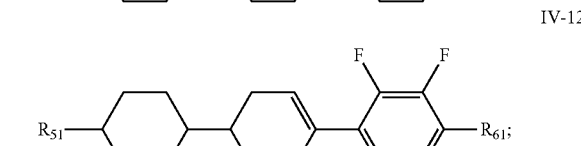
IV-6

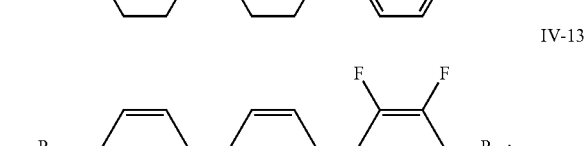
IV-7

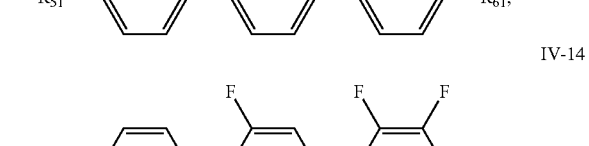
IV-8

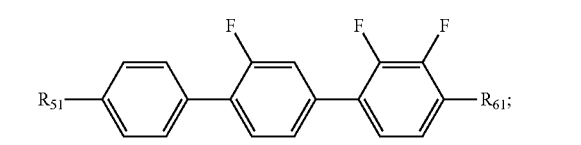
IV-9

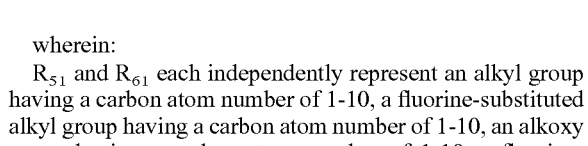
IV-10

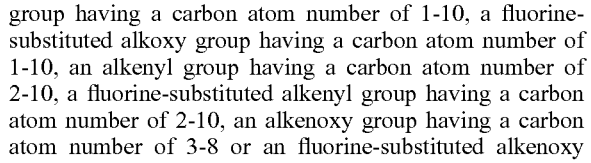
IV-11

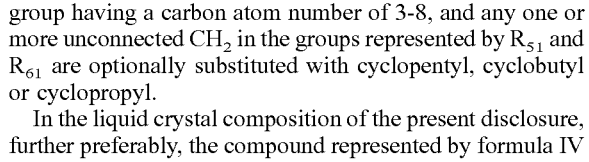
IV-12

IV-13

IV-14 wherein:

$R_{51}$ and $R_{61}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10, a fluorine-substituted alkenyl group having a carbon atom number of 2-10, an alkenoxy group having a carbon atom number of 3-8 or an fluorine-substituted alkenoxy group having a carbon atom number of 3-8, and any one or more unconnected $CH_2$ in the groups represented by $R_{51}$ and $R_{61}$ are optionally substituted with cyclopentyl, cyclobutyl or cyclopropyl.

In the liquid crystal composition of the present disclosure, further preferably, the compound represented by formula IV mentioned above is selected from the group consisting of compounds represented by formula IV-2 to IV-5 below:

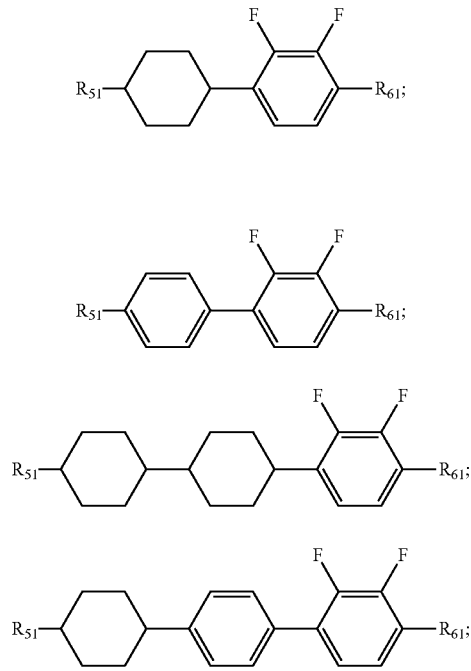

wherein the above-mentioned liquid crystal compounds have a large dielectric anisotropy, a suitable optical anisotropy, an appropriate rotary viscosity, and an appropriate K value, and may be used for developing a liquid crystal display or liquid crystal display element having negative dielectric anisotropy.

In the liquid crystal composition of the present disclosure, further preferably, the compound represented by formula IV mentioned above is selected from the group consisting of compounds represented by formula IV-2 and IV-3 below:

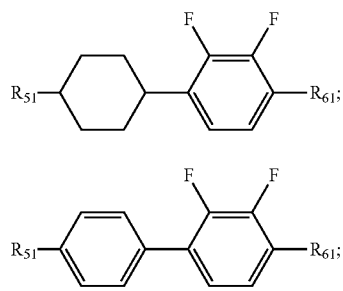

wherein the above-mentioned liquid crystal compounds have a large K value and a high clearing point, and may be used for developing a liquid crystal composition having a fast response and a wider temperature display range.

In the liquid crystal composition of the present disclosure, further preferably, the compound represented by formula IV mentioned above is selected from the group consisting of compounds represented by formula IV-4 and IV-5 below:

wherin the above-mentioned liquid crystal compounds have such a rotary viscosity γ1 that they can be used for developing a liquid crystal composition having a fast response.

In the liquid crystal composition of the present disclosure, preferably, where the total content of the components other than the polymerizable compound is 100% by mass, the total mass content of the compound represented by formula I above is 1%-65%; the total mass content of the compound represented by formula II above is 1%-15%; the polymerizable compound above is added on the basis of the total mass % of the liquid crystal in an amount of 0.01%-1%, preferably 0.03%-0.4%; and the total mass content of the compound represented by formula III above is 1%-25%.

The liquid crystal composition of the present disclosure preferably further comprises one or more compounds represented by formula V:

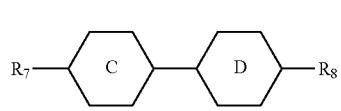

wherein, $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and

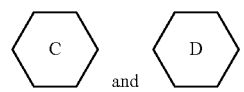

and each independently represent 1,4-cyclohexylene, 1,4-cyclohexenylene or 1,4-phenylene; furthermore, where

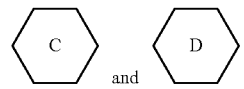

simultaneously represent 1,4-cyclohexylene, and one of $R_5$ and $R_6$ represents propyl, the other does not represent vinyl.

In the liquid crystal composition of the present disclosure, preferably, the compound represented by formula V mentioned above is selected from the group consisting of compounds represented by formula V-1 to V-3 below:

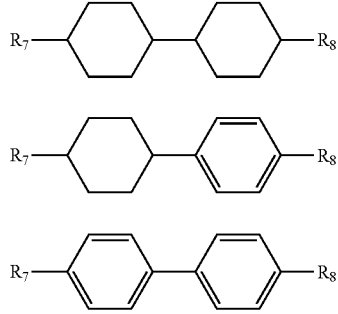

wherein, $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and in formula V-1, where one of $R_7$ and $R_8$ represents propyl, the other does not represent vinyl.

The liquid crystal composition of the present disclosure preferably further comprises one or more compounds represented by formula VI:

wherein, $R_9$ and $R_{10}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and

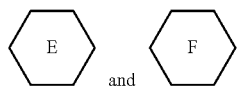

each independently represent 1,4-cyclohexylene 1,4-cyclohexenylene or 1,4-phenylene; furthermore, where

represents 1,4-cyclohexylene,

represents 1,4-phenylene, $R_9$ and $R_{10}$ do not simultaneously represent an alkyl group having a carbon atom number of 1-10.

In the liquid crystal composition of the present disclosure, preferably, the compound represented by formula VI mentioned above is selected from the group consisting of compounds represented by formula VI-1 to VI-3 below:

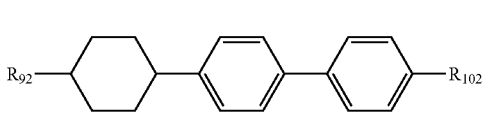

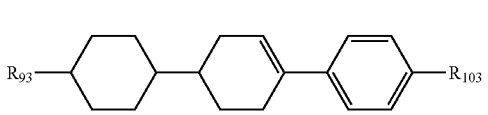

wherein, $R_{91}$, $R_{92}$, $R_{93}$, $R_{101}$, $R_{102}$ and $R_{103}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; furthermore, $R_{92}$ and $R_{102}$ do not simultaneously represent an alkyl group having a carbon atom number of 1-10.

[Liquid Crystal Display Element]

The liquid crystal display element of the present disclosure comprises the liquid crystal composition of the present disclosure, which liquid crystal display element is an active matrix display element or a passive matrix display element.

Optionally, said liquid crystal display element may be an active matrix liquid crystal display element.

Optionally, said active matrix display element may be, for example, a PSVA-TFT liquid crystal display element.

The liquid crystal display element comprising the liquid crystal composition of the present disclosure has a faster response speed and a smaller cell thickness.

[Liquid Crystal Display]

The liquid crystal display of the present disclosure comprises the liquid crystal composition of the present disclosure, which liquid crystal display is an active matrix display or a passive matrix display.

Optionally, said liquid crystal display may be an active matrix liquid crystal display.

Optionally, said active matrix display may be, for example, a PSVA-TFT liquid crystal display.

The liquid crystal display comprising the liquid crystal composition of the present disclosure has a faster response speed and a smaller cell thickness.

Example

In order to more clearly illustrate the present disclosure, the present disclosure is further described below in conjunction with preferred examples. A person skilled in the art should understand that the content described in detail below is illustrative rather than limiting, and should not limit the scope of protection of the present disclosure.

In this description, unless otherwise specified, percentages are mass percentages, temperatures are in degree Celsius (° C.), and the specific meanings of the other symbols and the test conditions are as follows:

Cp represents the clearing point (° C.) of the liquid crystal measured by a DSC quantitative method;

Δn represents optical anisotropy, $n_o$ is the refractive index of an ordinary light, $n_e$ is the refractive index of an extraordinary light, with the test conditions being: 25±2° C., 589 nm and using an abbe refractometer for testing;

Δε represents the dielectric anisotropy, $\Delta\varepsilon=\varepsilon_{//}-\varepsilon_{\perp}$, wherein $\varepsilon_{//}$ is a dielectric constant parallel to a molecular axis, and $\varepsilon_{//}$ is a dielectric constant perpendicular to the molecular axis, the test condition is 25±0.5° C., a 20 micron parallel cell is used, and INSTEC:ALCT-IR1 is used for the test;

γ1 represents a rotary viscosity (mPa·s), with the test conditions being 25±0.5° C., a 20 micron parallel cell, and INSTEC:ALCT-IR1 for testing; and K11 is twist elastic constant, and K33 is splay elastic constant, with the test conditions being: 25° C., INSTEC:ALCT-IR1, and 18 m vertical cell;

A method for preparing the liquid crystal composition involves: weighing various liquid crystal monomers at a certain ratio and then placing them in a stainless steel beaker; placing the stainless steel beaker containing these liquid crystal monomers on a magnetic stirring instrument for heating and melting; and after the liquid crystal monomers in the stainless steel beaker are mostly melted, adding a magnetic rotor to the stainless steel beaker; uniformly stirring the mixture; and cooling the mixture to room temperature to obtain the liquid crystal composition.

In the examples of the present disclosure, liquid crystal monomer structures are represented by codes, wherein the codes of cyclic structures, end groups and linking groups of liquid crystals are represented as follows in tables 1 and 2.

TABLE 1

| Corresponding code for ring structure | |
|---|---|
| Ring structure | Corresponding code |
|  | C |
| 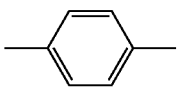 | P |
| 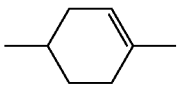 | L |
| 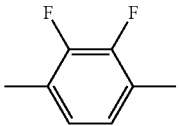 | Y |

TABLE 1-continued

| Corresponding code for ring structure | |
|---|---|
| Ring structure | Corresponding code |
| 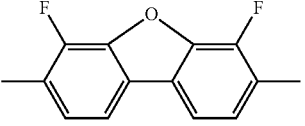 | Sb |
| 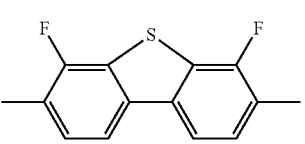 | Sc |

TABLE 2

| Corresponding code for end group and linking group | |
|---|---|
| End group and linking group | Corresponding code |
| $C_nH_{2n+1}$— | n- |
| $C_nH_{2n+1}O$— | nO— |
| —$CF_3$ | —T |
| —$OCF_3$ | —OT |
| —$CH_2O$— | —O— |
| —F | —F |
| —$CH_2CH_2$— | —E— |
| —CH═CH— | —V— |
| —CH═CH—$C_nH_{2n+1}$ | Vn— |
| 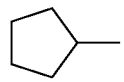 | Cp— |
| 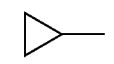 | CPr— |
|  | CPr1— |

EXAMPLES

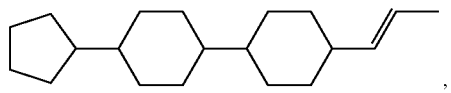

the code of which is CC-Cp-V1;

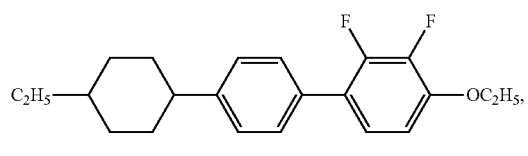

the code of which is CPY-2-O2;

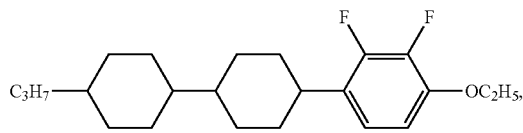

the code of which is CCY-3-O2;

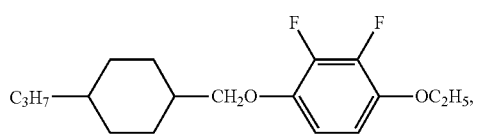

the code of which is COY-3-O2;

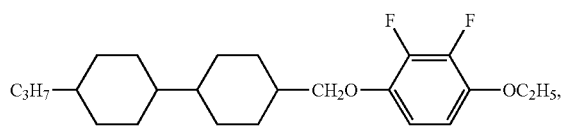

the code of which is CCOY-3-O2; and

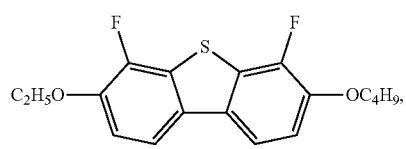

the code of which is Sc-2O—O4.

Example 1

The formulation of the liquid crystal composition and the corresponding properties thereof are as shown in table 3 below.

TABLE 3

Formulation of the liquid crystal composition of Example 1 and the corresponding properties thereof

| Category | Liquid crystal monomer code | Content (in parts by mass) |
|---|---|---|
| I | CC-3-V | 65 |
| II | CPP-3-2 | 10 |
| III | Sc-2O-O4 | 13 |
| III | Sc-2O-O2 | 12 |
|  | RM-1 | 0.3 |

Δε [1 KHz, 25° C.]: −2.7
Δn [589 nm, 25° C.]: 0.095
Cp: 60° C.
$\gamma_1$: 43 mPa · s
K33: 11.8

Comparative Example 1

The formulation of the liquid crystal composition and the corresponding properties thereof are as shown in table 4 below.

TABLE 4

Formulation of the liquid crystal composition of Comparative Example 1 and the corresponding properties thereof

| Category | Liquid crystal monomer code | Content (in parts by mass) |
|---|---|---|
|  | CC-5-V | 65 |
| II | CPP-3-2 | 10 |
| III | Sc-2O-O4 | 13 |
| III | Sc-2O-O2 | 12 |
|  | RM-1 | 0.3 |

Δε [1 KHz, 25° C.]: −2.9
Δn [589 nm, 25° C.]: 0.098
Cp: 64° C.
$\gamma_1$: 69 mPa · s
K33: 12.7

CC-3-V in Example 1 is replaced by CC-5-V to form Comparative Example 1. By comparing Example 1 with Comparative Example 1, Comparative Example 1 has crystal precipitation at normal temperature, and differs to a smaller extent in the properties of dielectricity and refractive index; furthermore, the rotary viscosity γ1 is increased, and K33 is slightly changed, the γ1/K33 ratio is increased, and the response become slow. It can be seen therefrom that the liquid crystal composition of the present disclosure has a suitable optical anisotropy, a suitable dielectric anisotropy, a good low-temperature mutual solubility, and a fast response speed.

Comparative Example 2

The formulation of the liquid crystal composition and the corresponding properties thereof are as shown in table 5 below.

TABLE 5

Formulation of the liquid crystal composition of Comparative Example 2 and the corresponding properties thereof

| Category | Liquid crystal monomer code | Content (in parts by mass) |
|---|---|---|
| I | CC-3-V | 65 |
|  | CCP-3-1 | 10 |
| III | Sc-2O-O4 | 13 |
| III | Sc-2O-O2 | 12 |
|  | RM-1 | 0.3 |

Δε [1 KHz, 25° C.]: −2.7
Δn [589 nm, 25° C.]: 0.088
Cp: 61° C.
$\gamma_1$: 44 mPa · s
K33: 12.3

CPP-3-2 in Example 1 is replaced by CCP-3-1 to form Comparative Example 2. By comparing Example 1 with Comparative Example 2, Comparative Example 2 differs to a smaller extent in the properties of dielectricity and clearing point, but has a reduced refractive index. It can be seen therefrom that the liquid crystal composition of the present disclosure has a suitable optical anisotropy, a wider temperature display range and a suitable dielectric anisotropy.

Comparative Example 3

The formulation of the liquid crystal composition and the corresponding properties thereof are as shown in table 6 below.

TABLE 6

Formulation of the liquid crystal composition of Comparative Example 3 and the corresponding properties thereof

| Category | Liquid crystal monomer code | Content (in parts by mass) |
|---|---|---|
| I | CC-3-V | 65 |
| II | CPP-3-2 | 10 |
| | Sb-4O-O4 | 13 |
| | Sb-5O-O2 | 12 |
| | RM-1 | 0.3 |

Δε [1 KHz, 25° C.]: −2.7
Δn [589 nm, 25° C.]: 0.077
Cp: 48° C.
$\gamma_1$: 44 mPa · s
K33: 10.3

Sc-2O—O4 and Sc-2O—O2 in Example 1 are replaced by Sb-4O—O4 and Sb-5O—O2 to form Comparative Example 3. By comparing Example 1 with Comparative Example 3, Comparative Example 3 has a reduced refractive index, a reduced clearing point, an increased γ1/K33 ratio, and a slow response. It can be seen therefrom that the liquid crystal composition of the present disclosure has the characteristics of a suitable optical anisotropy, a wider temperature display range and a fast response speed.

Example 2

The formulation of the liquid crystal composition and the corresponding properties thereof are as shown in table 7 below.

TABLE 7

Formulation of the liquid crystal composition of Example 2 and the corresponding properties thereof

| Category | Liquid crystal monomer code | Content (in parts by mass) |
|---|---|---|
| I | CC-3-V | 33.5 |
| II | CPP-3-2 | 5 |
| II | CPP-5-2 | 7 |
| III | Sc-2O-O4 | 5 |
| IV | PY-2O-O4 | 3 |
| IV | CY-3-O2 | 12.5 |
| IV | CCY-5-O2 | 10 |
| IV | CCY-3-O2 | 11 |
| IV | CPY-3-O2 | 13 |
| | RM-1 | 0.27 |

Δε [1 KHz, 25° C.]: −3.4
Δn [589 nm, 25° C.]: 0.107
Cp: 94° C.
$\gamma_1$: 117 mPa · s
K33: 17.4

Example 3

The formulation of the liquid crystal composition and the corresponding properties thereof are as shown in table 8 below.

TABLE 8

Formulation of the liquid crystal composition of Example 3 and the corresponding properties thereof

| Category | Liquid crystal monomer code | Content (in parts by mass) |
|---|---|---|
| I | CC-3-V | 29.5 |
| II | CPP-3-2 | 5 |
| II | CPP-5-2 | 2 |
| III | Sc-4O-O4 | 7 |
| IV | CY-3-O2 | 15 |
| IV | COY-3-O2 | 13 |
| IV | CCY-3-O2 | 11 |
| IV | CCY-5-O3 | 7 |
| IV | CPY-3-O2 | 5 |
| IV | CCOY-3-O2 | 5.5 |
| | RM-3 | 0.03 |

Δε [1 KHz, 25° C.]: −4.5
Δn [589 nm, 25° C.]: 0.094
Cp: 74° C.
$\gamma_1$: 102 mPa · s
K33: 15.1

Comparative Example 4

The formulation of the liquid crystal composition and the corresponding properties thereof are as shown in table 9 below.

TABLE 9

Formulation of the liquid crystal composition of Comparative Example 4 and the corresponding properties thereof

| Category | Liquid crystal monomer code | Content (in parts by mass) |
|---|---|---|
| | CC-2-3 | 29.5 |
| II | CPP-3-2 | 5 |
| II | CPP-5-2 | 2 |
| III | Sc-4O-O4 | 7 |
| IV | CY-3-O2 | 15 |
| IV | COY-3-O2 | 13 |
| IV | CCY-3-O2 | 11 |
| IV | CCY-5-O3 | 7 |
| IV | CPY-3-O2 | 5 |
| IV | CCOY-3-O2 | 5.5 |
| | RM-3 | 0.03 |

Δε [1 KHz, 25° C.]: −4.7
Δn [589 nm, 25° C.]: 0.090
Cp: 70° C.
$\gamma_1$: 112 mPa · s
K33: 12.8

CC-3-V in Example 3 is replaced by CC-2-3 to form Comparative Example 4. By comparing Example 3 with Comparative Example 4, Comparative Example 4 has crystal precipitation at normal temperature; furthermore, the optical anisotropy is reduced, the clearing point is reduced, the rotary viscosity is increased, the K33 is reduced, the γ1/K33 ratio is increased, and the response becomes slow. It can be seen therefrom that the liquid crystal composition of the present disclosure has the characteristics of a suitable optical anisotropy, a good low-temperature mutual solubility, and a fast response speed.

Example 4

The formulation of the liquid crystal composition and the corresponding properties thereof are as shown in table 10 below.

TABLE 10

Formulation of the liquid crystal composition of Example 4 and the corresponding properties thereof

| Category | Liquid crystal monomer code | Content (in parts by mass) |
|---|---|---|
| I | CC-3-V | 15.5 |
| II | CPP-3-2 | 5 |
| III | Sc-2O-O4 | 5 |
| III | Sc-4O-O4 | 6 |
| IV | CY-3-O2 | 11 |
| IV | CPY-3-O2 | 5 |
| IV | COY-3-O2 | 15 |
| IV | COY-3-O1 | 5 |
| V | CC-2-3 | 20 |
| V | CC-4-3 | 5 |
| V | PP-5-1 | 3 |
| V | CP-3-O2 | 4.5 |
|  | RM-3 | 0.4 |

$\Delta\varepsilon$ [1 KHz, 25° C.]: −3.8
$\Delta n$ [589 nm, 25° C.]: 0.092
Cp: 60° C.
$\gamma_1$: 65 mPa · s
K33: 10.0

Example 5

The formulation of the liquid crystal composition and the corresponding properties thereof are as shown in table 11 below.

TABLE 11

Formulation of the liquid crystal composition of Example 5 and the corresponding properties thereof

| Category | Liquid crystal monomer code | Content (in parts by mass) |
|---|---|---|
| I | CC-3-V | 45 |
| II | CPP-3-2 | 2 |
| III | Sc-2O-O2 | 5 |
| III | Sc-2O-O4 | 6 |
| IV | PY-3-O2 | 11 |
| IV | CCOY-3-O2 | 11 |
| IV | CY-3-O2 | 5 |
| V | CC-2-3 | 3 |
| VI | CCP-3-O1 | 3 |
| VI | CCP-V-1 | 4 |
| VI | CPP-3-2V1 | 3 |
|  | RM-3 | 0.55 |

$\Delta\varepsilon$ [1 KHz, 25° C.]: −3.3
$\Delta n$ [589 nm, 25° C.]: 0.093
Cp: 65° C.
$\gamma_1$: 61 mPa · s
K33: 13.0

Example 6

The formulation of the liquid crystal composition and the corresponding properties thereof are as shown in table 12 below.

TABLE 12

Formulation of the liquid crystal composition of Example 6 and the corresponding properties thereof

| Category | Liquid crystal monomer code | Content (in parts by mass) |
|---|---|---|
| I | CC-3-V | 19.5 |
| II | CPP-3-2 | 5 |
| III | Sc-2O-O4 | 7.5 |
| IV | COY-3-O2 | 7 |
| IV | CPY-3-O2 | 13 |
| IV | PY-3-O2 | 7 |
| IV | CLY-3-O2 | 3 |
| V | CC-2-3 | 20 |
| V | CC-5-3 | 5 |
| V | CP-3-O2 | 4.5 |
| VI | CCP-V2-1 | 5 |
| VI | CPP-3-2V1 | 3.5 |
|  | RM-3 | 0.07 |

$\Delta\varepsilon$ [1 KHz, 25° C.]: −2.9
$\Delta n$ [589 nm, 25° C.]: 0.098
Cp: 72° C.
$\gamma_1$: 68 mPa · s
K33: 13.5

Comparative Example 5

The formulation of the liquid crystal composition and the corresponding properties thereof are as shown in table 13 below.

TABLE 13

Formulation of the liquid crystal composition of Comparative Example 5 and the corresponding properties thereof

| Category | Liquid crystal monomer code | Content (in parts by mass) |
|---|---|---|
| I | CC-3-V | 19.5 |
| II | CPP-3-2 | 5 |
|  | Sc-Cp1O-O4 | 7.5 |
| IV | COY-3-O2 | 7 |
| IV | CPY-3-O2 | 13 |
| IV | PY-3-O2 | 7 |
| IV | CLY-3-O2 | 3 |
| V | CC-2-3 | 20 |
| V | CC-5-3 | 5 |
| V | CP-3-O2 | 4.5 |
| VI | CCP-V2-1 | 5 |
| VI | CPP-3-2V1 | 3.5 |
|  | RM-3 | 0.07 |

$\Delta\varepsilon$ [1 KHz, 25° C.]: −2.7
$\Delta n$ [589 nm, 25° C.]: 0.096
Cp: 71° C.
$\gamma_1$: 70 mPa · s
K33: 13.1

Sc-2O—O4 in Example 6 is replaced by Sc-Cp1O—O4 to form Comparative Example 5. By comparing Example 6 with Comparative Example 5, Comparative Example 5 has a reduced dielectricity, a slightly reduced refractive index, a reduced clearing point, an increased γ1/K33 ratio, and a slow response; therefore, the present disclosure has a suitable optical anisotropy, a wider temperature display range, a larger dielectric anisotropy, and a fast response speed.

Comparative Example 6

The formulation of the liquid crystal composition and the corresponding properties thereof are as shown in table 14 below.

TABLE 14

Formulation of the liquid crystal composition of Comparative Example 6 and the corresponding properties thereof

| Category | Liquid crystal monomer code | Content (in parts by mass) |
|---|---|---|
|  | CC-5-V | 19.5 |
| II | CPP-3-2 | 5 |
| III | Sc-2O-O4 | 7.5 |
| IV | COY-3-O2 | 7 |
| IV | CPY-3-O2 | 13 |
| IV | PY-3-O2 | 7 |
| IV | CLY-3-O2 | 3 |
| V | CC-2-3 | 20 |
| V | CC-5-3 | 5 |
| V | CP-3-O2 | 4.5 |
| VI | CCP-V2-1 | 5 |
| VI | CPP-3-2V1 | 3.5 |
|  | RM-3 | 0.07 |

$\Delta\varepsilon$ [1 KHz, 25° C.]: −2.9
$\Delta n$ [589 nm, 25° C.]: 0.099
Cp: 73° C.
$\gamma_1$: 78 mPa · s
K33: 13.8

CC-3-V in Example 6 is replaced by CC-5-V to form Comparative Example 6. By comparing Example 6 with Comparative Example 6, Comparative Example 6 differs to a smaller extent in the properties of dielectricity, refractive index and clearing point; furthermore, the rotary viscosity $\gamma_1$ is increased, and the K33 is slightly changed, the $\gamma_1$/K33 ratio is increased, and the response becomes slow. It can be seen therefrom that the liquid crystal composition of the present disclosure has a suitable optical anisotropy, a wider temperature display range, a larger dielectric anisotropy, and a fast response speed.

Comparative Example 7

The formulation of the liquid crystal composition and the corresponding properties thereof are as shown in table 15 below.

TABLE 15

Formulation of the liquid crystal composition of Comparative Example 7 and the corresponding properties thereof

| Category | Liquid crystal monomer code | Content (in parts by mass) |
|---|---|---|
| I | CC-3-V | 19.5 |
| II | CPP-3-2 | 5 |
|  | Sb-4O-O4 | 7.5 |
| IV | COY-3-O2 | 7 |
| IV | CPY-3-O2 | 13 |
| IV | PY-3-O2 | 7 |
| IV | CLY-3-O2 | 3 |
| V | CC-2-3 | 20 |
| V | CC-5-3 | 5 |
| V | CP-3-O2 | 4.5 |
| VI | CCP-V2-1 | 5 |
| VI | CPP-3-2V1 | 3.5 |
|  | RM-3 | 0.07 |

$\Delta\varepsilon$ [1 KHz, 25° C.]: −2.8
$\Delta n$ [589 nm, 25° C.]: 0.094
Cp: 67° C.
$\gamma_1$: 69 mPa · s
K33: 12.2

Sc-2O—O4 in Example 6 is replaced by Sb-4O—O4 to form Comparative Example 7. By comparing Example 6 with Comparative Example 7, Comparative Example 7 has a reduced dielectricity, a reduced refractive index, a reduced clearing point, an increased rotary viscosity $\gamma_1$, a reduced K33, an increased $\gamma_1$/K33 ratio, and a slow response. It can be seen therefrom that the liquid crystal composition of the present disclosure has a suitable optical anisotropy, a wider temperature display range, a larger dielectric anisotropy, and a fast response speed.

Comparative Example 8

The formulation of the liquid crystal composition and the corresponding properties thereof are as shown in table 16 below.

TABLE 16

Formulation of the liquid crystal composition of Comparative Example 8 and the corresponding properties thereof

| Category | Liquid crystal monomer code | Content (in parts by mass) |
|---|---|---|
| I | CC-3-V | 19.5 |
|  | CCP-3-1 | 5 |
| III | Sc-2O-O4 | 7.5 |
| IV | COY-3-O2 | 7 |
| IV | CPY-3-O2 | 13 |
| IV | PY-3-O2 | 7 |
| IV | CLY-3-O2 | 3 |
| V | CC-2-3 | 20 |
| V | CC-5-3 | 5 |
| V | CP-3-O2 | 4.5 |
| VI | CCP-V2-1 | 5 |
| VI | CPP-3-2V1 | 3.5 |
|  | RM-3 | 0.07 |

$\Delta\varepsilon$ [1 KHz, 25° C.]: −2.9
$\Delta n$ [589 nm, 25° C.]: 0.098
Cp: 72° C.
$\gamma_1$: 68 mPa · s
K33: 13.5

CPP-3-2 in Example 6 is replaced by CCP-3-1 to form Comparative Example 8. By comparing Example 6 with Comparative Example 8, Comparative Example 8 differs to a smaller extent in the properties of dielectricity and clearing point, but has a reduced refractive index. It can be seen therefrom that the liquid crystal composition of the present disclosure has a suitable optical anisotropy, a wider temperature display range and a suitable dielectric anisotropy.

Example 7

The formulation of the liquid crystal composition and the corresponding properties thereof are as shown in table 17 below.

TABLE 17

Formulation of the liquid crystal composition of Example 7 and the corresponding properties thereof

| Category | Liquid crystal monomer code | Content (in parts by mass) |
|---|---|---|
| I | CC-3-V | 25 |
| II | CPP-3-2 | 5 |
| III | Sc-2O-O2 | 13 |
| IV | CPY-3-O2 | 7 |
| IV | PY-3-O2 | 9 |
| IV | COY-3-O2 | 8 |
| IV | CCY-3-O2 | 5 |
| IV | CCOY-3-O2 | 11 |
| V | CC-4-3 | 5 |
| V | CC-5-3 | 3 |
| V | PP-5-O2 | 3 |

TABLE 17-continued

Formulation of the liquid crystal composition of Example 7 and the corresponding properties thereof

| Category | Liquid crystal monomer code | Content (in parts by mass) |
|---|---|---|
| V | PP-5-1 | 2 |
| VI | CCP-V2-1 | 4 |
|  | RM-2 | 0.41 |

Δε [1 KHz, 25° C.]: −4.2
Δn [589 nm, 25° C.]: 0.110
Cp: 76° C.
$\gamma_1$: 94 mPa · s
K33: 14.6

Example 8

The formulation of the liquid crystal composition and the corresponding properties thereof are as shown in table 18 below.

TABLE 18

Formulation of the liquid crystal composition of Example 8 and the corresponding properties thereof

| Category | Liquid crystal monomer code | Content (in parts by mass) |
|---|---|---|
| I | CC-3-V | 13 |
| II | CPP-3-2 | 5 |
| II | CPP-5-2 | 3 |
| III | Sc-2O-O4 | 9 |
| IV | CPY-3-O2 | 13 |
| IV | PY-3-O2 | 5 |
| IV | CCY-3-O2 | 12 |
| IV | CY-3-O2 | 15 |
| V | CC-3-V1 | 5 |
| V | CC-2-3 | 9 |
| VI | CPP-3-2V1 | 4 |
| VI | CCP-3-O1 | 7 |
|  | RM-4 | 0.38 |

Δε [1 KHz, 25° C.]: −3.6
Δn [589 nm, 25° C.]: 0.114
Cp: 91° C.
$\gamma_1$: 113 mPa · s
K33: 16.6

Comparative Example 9

The formulation of the liquid crystal composition and the corresponding properties thereof are as shown in table 19 below.

TABLE 19

Formulation of the liquid crystal composition of Comparative Example 9 and the corresponding properties thereof

| Category | Liquid crystal monomer code | Content (in parts by mass) |
|---|---|---|
| I | CC-3-V | 13 |
| II | CPP-3-2 | 5 |
| II | CPP-5-2 | 3 |
|  | Sc-Cp1O-O2 | 9 |
| IV | CPY-3-O2 | 13 |
| IV | PY-3-O2 | 5 |
| IV | CCY-3-O2 | 12 |
| IV | CY-3-O2 | 15 |
| V | CC-3-V1 | 5 |
| V | CC-2-3 | 9 |
| VI | CPP-3-2V1 | 4 |
| VI | CCP-3-O1 | 7 |
|  | RM-4 | 0.38 |

Δε [1 KHz, 25° C.]: −3.3
Δn [589 nm, 25° C.]: 0.112
Cp: 89° C.
$\gamma_1$: 116 mPa · s
K33: 15.8

By comparing Example 8 with Comparative Example 9, Sc-2O—O4 in Example 8 is replaced by Sc-Cp1O—O2 to form Comparative Example 9, and Comparative Example 9 has a reduced dielectricity, a slightly reduced refractive index, a reduced clearing point, an increased γ1/K33 ratio, and a slow response; therefore, the present disclosure has a suitable optical anisotropy, a wider temperature display range, a larger dielectric anisotropy, and a fast response speed.

Example 9

The formulation of the liquid crystal composition and the corresponding properties thereof are as shown in table 20 below.

TABLE 20

Formulation of the liquid crystal composition of Example 9 and the corresponding properties thereof

| Category | Liquid crystal monomer code | Content (in parts by mass) |
|---|---|---|
| I | CC-3-V | 5 |
| II | CPP-3-1 | 5 |
| II | CPP-5-2 | 3 |
| III | Sc-2O-O4 | 3 |
| IV | PY-3-O2 | 9 |
| IV | PY-2O-O2 | 5 |
| IV | CCY-3-O2 | 15 |
| IV | CCOY-3-O2 | 11 |
| IV | CLY-3-O2 | 3 |
| V | CC-2-3 | 15 |
| V | CC-5-3 | 7 |
| V | PP-5-O2 | 8 |
| VI | CCP-3-O1 | 7 |
| VI | CCP-V2-1 | 4 |
|  | RM-3 | 0.55 |

Δε [1 KHz, 25° C.]: −3.3
Δn [589 nm, 25° C.]: 0.111
Cp: 98° C.
$\gamma_1$: 125 mPa · s
K33: 18.7

Example 10

The formulation of the liquid crystal composition and the corresponding properties thereof are as shown in table 21 below.

TABLE 21

Formulation of the liquid crystal composition of Example 10 and the corresponding properties thereof

| Category | Liquid crystal monomer code | Content (in parts by mass) |
|---|---|---|
| I | CC-3-V | 10 |
| II | CPP-3-2 | 4 |
| III | Sc-2O-O2 | 6 |
| IV | COY-3-O2 | 14 |
| IV | PY-3-O2 | 14.5 |
| IV | LY-Cp-O2 | 2 |
| IV | CCOY-3-O2 | 7 |
| V | CC-4-3 | 8 |
| V | CC-5-3 | 8 |
| V | CP-3-O2 | 1.5 |
| VI | CCP-V-1 | 4 |
| VI | CCP-3-O1 | 5 |
| VI | CCP-V2-1 | 5 |
| VI | CPP-3-2V1 | 11 |
| | RM-4 | 0.01 |

Δε [1 KHz, 25° C.]: −3.0
Δn [589 nm, 25° C.]: 0.113
Cp: 83° C.
γ$_1$: 82 mPa · s
K33: 13.7

Example 11

The formulation of the liquid crystal composition and the corresponding properties thereof are as shown in table 22 below.

TABLE 22

Formulation of the liquid crystal composition of Example 11 and the corresponding properties thereof

| Category | Liquid crystal monomer code | Content (in parts by mass) |
|---|---|---|
| I | CC-3-V | 17 |
| II | CPP-3-2 | 5 |
| III | Sc-2O-O4 | 6 |
| IV | PPY-5-O2 | 9 |
| IV | CY-3-O2 | 8 |
| IV | PYP-2-3 | 7 |
| IV | CPY-3-O2 | 13 |
| VI | CPP-1V-2 | 3 |
| VI | CPP-3-2V1 | 13 |
| VI | CCP-3-1 | 8 |
| VI | CCP-V-1 | 11 |
| | RM-2 | 1 |

Δε [1 KHz, 25° C.]: −2.6
Δn [589 nm, 25° C.]: 0.119
Cp: 119° C.
γ$_1$: 138 mPa · s
K33: 22.0

Obviously, the above-mentioned examples of the present disclosure are merely examples for clearly illustrating the present disclosure, rather than limiting the embodiments of the present disclosure; for a person of ordinary skill in the art, on the basis of the above description, other variations or changes in different forms may also be made, it is impossible to exhaustively give all of the embodiments thereof herein, and any obvious variation or change derived from the technical solution of the present invention is still within the scope of protection of the present invention.

The invention claimed is:

1. A liquid crystal composition, said liquid crystal composition comprising a compound represented by formula I, a compound represented by formula II, a compound represented by formula III, a compound represented by formula IV-7, a compound represented by formula IV-8, a compound represented by formula LY-Cp-O2, a compound represented by CP-3-O2, a compound represented by CPP-3-2V1, and at least one polymerizable compound:

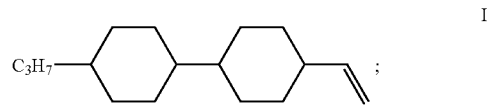

I

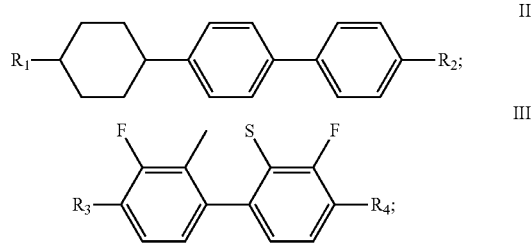

II

III

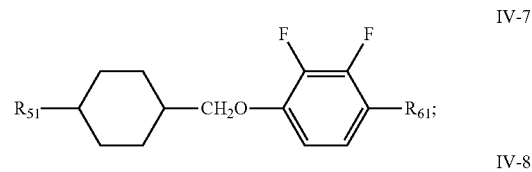

IV-7

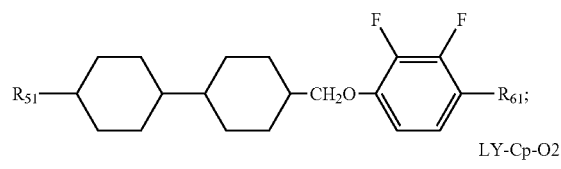

IV-8

LY-Cp-O2

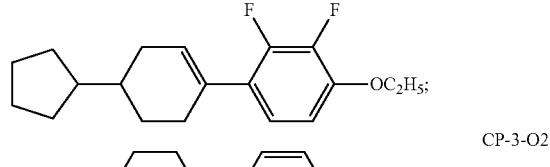

CP-3-O2

CPP-3-2V1

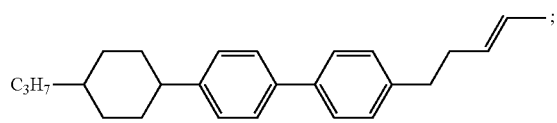

wherein:
R$_1$ represents an alkyl group having a carbon atom number of 3, R$_2$ represents an alkyl group having a carbon atom number of 2;
R$_3$ and R$_4$ each independently represents an alkoxy group having a carbon atom number of 2; and
R$_{51}$ represents an alkyl group having a carbon atom number of 3 and R$_{61}$ represent an alkoxy group having a carbon atom number of 2;
a total mass content of the compound represented by formula I is 10%; a total mass content of the compound represented by formula II is 4%; a polymerizable compound above is added on the basis of the total mass % of the liquid crystal in an amount of 0.03%-0.4%; and a total mass content of the compound represented by formula III is 6%; a total mass content of the compound represented by formula IV-7 is 14%; a total mass content of the compound represented by formula IV-8 is 7%; a total mass content of the compound represented by formula LY-Cp-O2 is 2%; a total mass content of the compound represented by formula CP-3-O2 is 1.5%; a total mass content of the compound represented by formula CPP-3-2V1 is 11%.

2. The liquid crystal composition according to claim 1, wherein said liquid crystal composition further comprises one or more compounds represented by formula V-1:

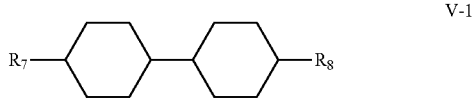

V-1 wherein $R_7$ and $R_8$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10; and in formula V-1, where one of $R_7$ and $R_8$ represents propyl, the other does not represent vinyl.

3. The liquid crystal composition according to claim 1, wherein said liquid crystal composition further comprises one or more compounds represented by formula VI-1:

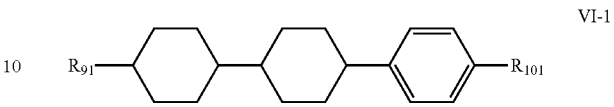

VI-1 wherein $R_{91}$, $R_{101}$ each independently represent an alkyl group having a carbon atom number of 1-10, a fluorine-substituted alkyl group having a carbon atom number of 1-10, an alkoxy group having a carbon atom number of 1-10, a fluorine-substituted alkoxy group having a carbon atom number of 1-10, an alkenyl group having a carbon atom number of 2-10 or a fluorine-substituted alkenyl group having a carbon atom number of 2-10.

4. A liquid crystal display element, comprising the liquid crystal composition of claim 1, wherein said liquid crystal display element is an active matrix addressing display element, or a passive matrix addressing display element.

5. A liquid crystal display, comprising the liquid crystal composition of claim 1, wherein said liquid crystal display is an active matrix addressing display, or a passive matrix addressing display.

* * * * *